United States Patent [19]

Hashizume et al.

[11] Patent Number: 5,422,568
[45] Date of Patent: Jun. 6, 1995

[54] SPEED SENSOR FOR USE WITH VEHICLE ROAD WHEEL AND INCLUDING CONNECTION LINE BREAKAGE DETECTION

[75] Inventors: Yoshikazu Hashizume; Tadayuki Kuze, both of Kanagawa, Japan

[73] Assignee: Unisia Jecs Corporation, Kanagawa, Japan

[21] Appl. No.: 62,438

[22] Filed: May 13, 1993

[30] Foreign Application Priority Data

May 18, 1992 [JP] Japan ............................. 4-032294 U

[51] Int. Cl.⁶ .................. G01P 3/44; G01P 3/487; G08C 25/00
[52] U.S. Cl. ..................... 324/166; 324/174; 324/500; 324/537; 327/511
[58] Field of Search ............ 324/166, 173, 174, 207.2, 324/207.21, 207.25, 251, 252, 500, 537; 307/239, 248, 260, 261, 309, 510, 116, 117; 328/5, 13, 28, 140

[56] References Cited

U.S. PATENT DOCUMENTS 4,518,918  5/1985  Avery ................. 324/207.2
5,218,298  6/1993  Vig ................. 324/207.2 X

FOREIGN PATENT DOCUMENTS 3-25275  1/1985  Japan.

*Primary Examiner*—Gerard R. Strecker
*Attorney, Agent, or Firm*—Bachman & LaPointe

[57] ABSTRACT

A road wheel speed sensor for use with an automotive vehicle supported on road wheels. A pulsating variation in magnetic flux is produced with rotation of one of the road wheels. A signal converter is provided for converting the pulsation magnetic flux' variation into a rectangular pulse signal to switching a transistor on and off. The signal converter is connected through power and signal lines to a processor. The transistor has a base electrode for receipt of the rectangular pulse signal, an emitter electrode, and a collector electrode connected to the signal line. A first resistor is connected between the power line and the signal line. A second resistor is connected between the power line and the emitter electrode of the transistor. A third resistor is connected between the signal line and the ground. The processor calculates a speed of rotation of the road wheel in response to a voltage developed across the third resistor.

2 Claims, 3 Drawing Sheets

SPEED SENSOR FOR USE WITH VEHICLE ROAD WHEEL AND INCLUDING CONNECTION LINE BREAKAGE DETECTION

BACKGROUND OF THE INVENTION

This invention relates to a road wheel speed sensor for use with an automotive vehicle supported on road wheels and, more particularly, to a vehicle road wheel speed sensor for detecting the speed of rotation of one of the road wheels in response to a pulsating variation in magnetic flux produced with rotation of the one road wheel.

Such a vehicle road wheel speed sensor is disclosed, for example, in Japanese Utility Model Publication No. 3-25275. The conventional vehicle road wheel speed sensor is associated with a rotor mounted for rotation in synchronism with rotation of one of vehicle road wheels to produce a pulse signal having a repetitive rate proportional to the speed of rotation of the one vehicle road wheel. The pulse signal is applied to switch a transistor on and off so as to produce a sensor signal in response to which a control unit calculates the speed of rotation of the one vehicle road wheel. The conventional vehicle road wheel speed sensor is connected to the control unit through three connection lines, that is, power, ground and signal connection lines. With the conventional vehicle road wheel speed sensor, however, it is impossible to detect breakage in the connection lines based upon the sensor signal as will be described in detail.

SUMMARY OF THE INVENTION

A main object of the invention is to provide a simple and inexpensive vehicle road wheel speed sensor which can produce a sensor signal used in detecting a failure or breakage in the lines connected between the vehicle road wheel speed sensor and the control unit.

There is provided, in accordance with the invention, a road wheel speed sensor for use with an automotive vehicle supported on road wheels. The road wheel speed sensor comprises a processor, means for producing a pulsating variation in magnetic flux with rotation of one of the road wheels, a signal converter for converting the pulsation magnetic flux variation into a rectangular pulse signal, a power line for connection of the signal converter to a source of power, a signal line for connection of the signal converter to the processor, and a transistor responsive to the rectangular pulse signal for switching between conductive and non-conductive states. The transistor has a base electrode for receipt of the rectangular pulse signal, an emitter electrode, and a collector electrode connected to the signal line. The road wheel speed sensor also includes a first resistor connected between the power line and the signal line, a second resistor connected between the power line and the emitter electrode of the transistor, and a third resistor connected between the signal line and the ground. The processor calculates a speed of rotation of the road wheel in response to a voltage across the third resistor.

BRIEF DESCRIPTION OF THE DRAWING

The invention will be described in greater detail by reference to the following description taken in connection with the accompanying drawings, in which.

DETAILED DESCRIPTION OF THE INVENTION

Figure 4:
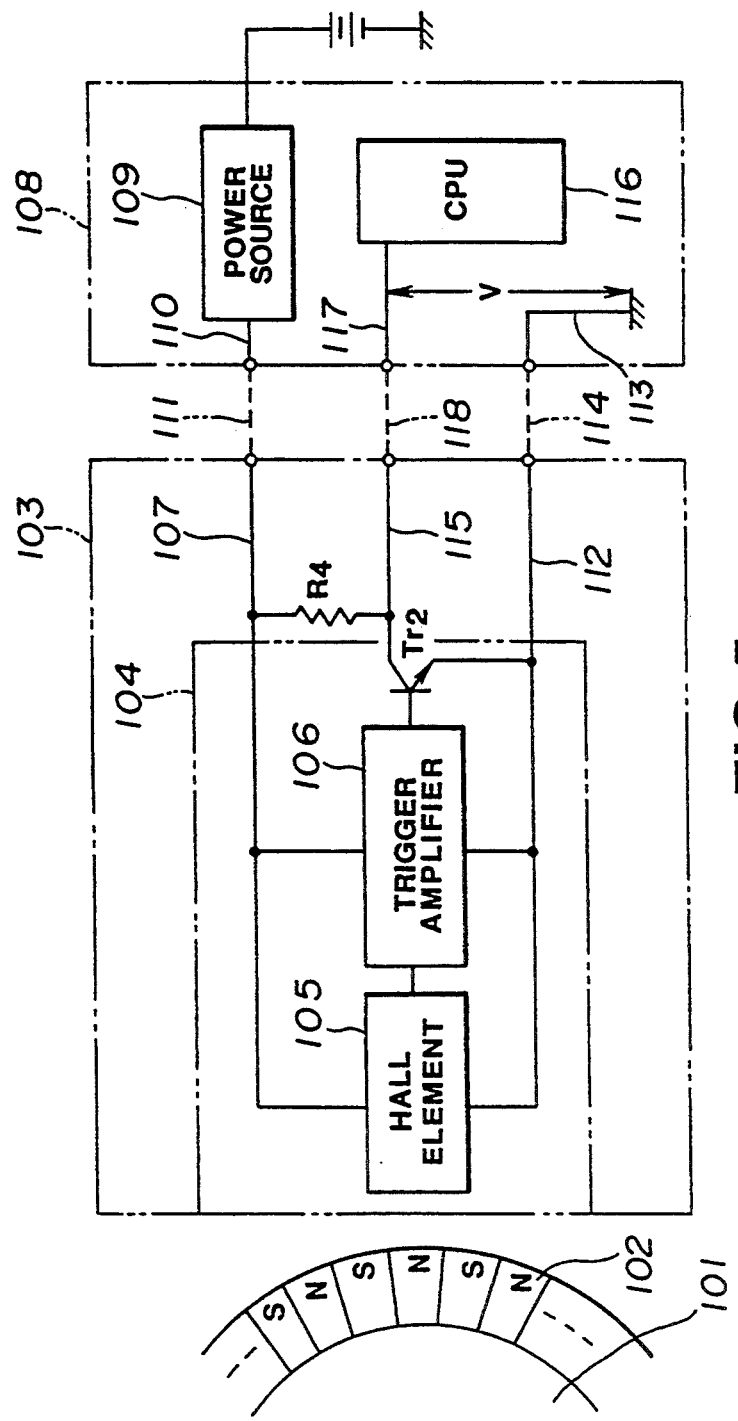
FIG. 4 is a schematic block diagram showing a conventional vehicle road wheel speed sensor.

Prior to the description of the preferred embodiment of the invention, the prior art vehicle road wheel speed sensor of FIG. 4 is briefly described in order to provide a basis for a better understanding of the difficulties attendant thereon.

Figure 5:
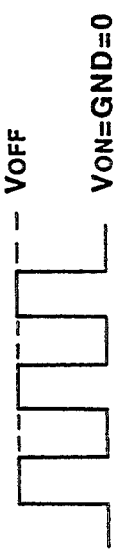
FIG. 5 illustrates a voltage waveform showing the voltage developed in the conventional vehicle road wheel speed sensor.

FIG. 4 shows a conventional vehicle road wheel speed sensor disclosed, for example, in Japanese Utility Model Publication No. 3-25275. The conventional vehicle road wheel speed sensor, which is used in a vehicle antilock brake system, includes a Hall IC 104 associated with a rotor 101 mounted on a vehicle road wheel for rotation in synchronism therewith. The rotor 101 has a plurality of permanent magnets 102 provided around the rotor 101 to have their poles changed alternatively so as to produce a pulsating variation in magnetic flux with rotation of the rotor 101. The Hall IC 104 includes a Hall element 105, a trigger amplifier circuit 106, a transistor Tr2 and a pull-up resistor R4. The Hall element 105 is coupled magnetically in a magnetic circuit with the permanent magnets 102. The Hall element 105 is powered through a power line 107 and grounded through a ground line 112. The Hall element 105 produces an alternating voltage signal at its output terminal as a result of changes in magnetic flux produced with rotation of the rotor 101. The alternating voltage signal is applied from the Hall element 105 to the trigger amplifier circuit 106. The trigger amplifier circuit 106, which is powered through the power line 107 and grounded through the ground line 112, shapes the waveform of the alternating voltage signal applied thereto into a rectangular waveform, as shown in FIG. 5. The shaped and amplified signal is applied from the trigger amplifier circuit 106 to operate the transistor Tr2. For this purpose, the trigger amplifier circuit 106 has an output terminal coupled to the base electrode of the transistor Tr2, the emitter electrode of which is connected to the ground line 112. The collector electrode of the transistor Tr2 is connected to an output line 115. The resistor R4 is connected between the power and output lines 107 and 115.

The vehicle road wheel speed sensor 103 is connected through connection lines 111, 114 and 118 to a control unit 108 placed at a position remote from the vehicle road wheel speed sensor 103. The control unit 108 includes a power source 109 for supplying power to the vehicle road wheel speed sensor 103 and a central processing unit (CPU) 116 for detecting the speed of rotation of the vehicle road wheel in response to a voltage V applied thereto from the vehicle road wheel speed sensor 103. The power source 109 is connected through a power line 110 to the connection line 111 which in turn is connected to the power line 107. The ground line 112 is connected through the connection line 114 to a ground line 113 which is grounded in the control unit 108. The output line 115 is connected through the connection line 118 to a line 117 which is connected to the CPU 116.

After the vehicle starts, the rotor 101 rotates to switch the transistor Tr2 on and off at intervals of time proportional to the speed of rotation of the road wheel. When the transistor Tr2 is "off" (that is, in the non-conductive state), the potential V of the line 117 with respect to the ground is at a high level equal to the power voltage Voff, as shown in FIG. 5. When the transistor Tr2 is "on" (or in the conduction state), the potential V of the line 117 with respect to the ground is at a low level equal to a ground potential GND (=0).

Under a locked condition of the vehicle road wheel, the transistor Tr2 remains "on" or "off" to hold the potential V at the low level Von (=0) or at the high level Voff. The potential V is held at the low level Von (=0) when at least one of the connection line 111 and 118 is broken and at the high level Voff when the connection line 114 is broken. That is, the detected voltage V remains at the high or low level when the road wheel is locked and also when one of the connection lines 111, 114 and 118 is broken. With the conventional road wheel speed sensor, therefore, it is impossible to detect a breakage in the connection lines 111, 114 and 118 based upon the detected voltage V. Furthermore, the conventional vehicle road wheel speed sensor requires three connection lines 111, 114 and 118, resulting in an expensive sensor.

Figure 1:
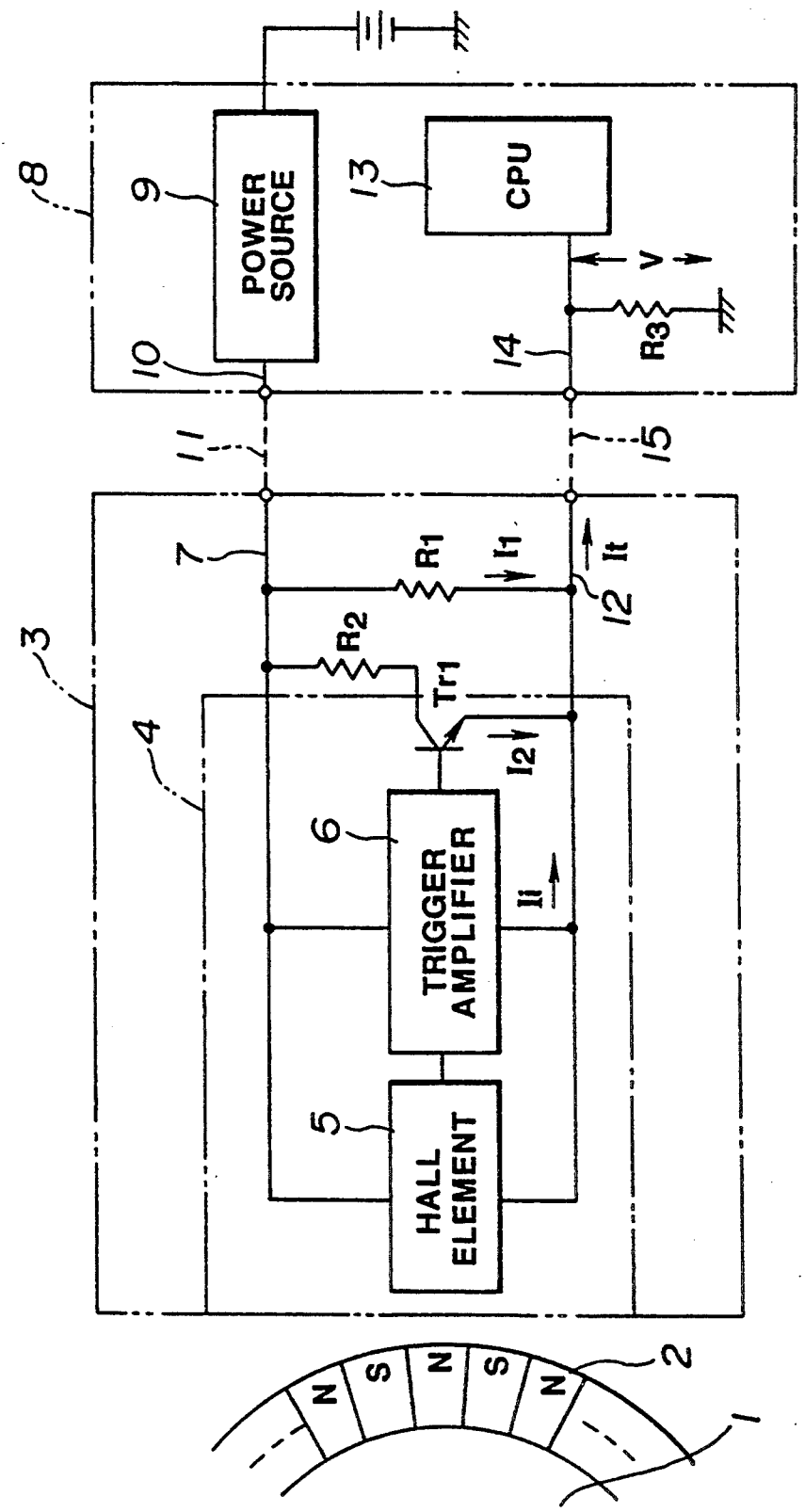
FIG. 1 is a schematic block diagram showing one embodiment of a vehicle road wheel speed sensor made in accordance with the invention.

Referring to FIG. 1, there is shown a schematic block diagram of a vehicle road wheel speed sensor embodying the invention. The vehicle road wheel speed sensor, generally designated by the numeral 3, includes a Hall IC 4 associated with a rotor 1 mounted on a vehicle road wheel for rotation in synchronism therewith. The rotor 1 has a plurality of permanent magnets 2 provided around the rotor 1 to have their poles changed alternatively so as to produce a pulsating variation in magnetic flux with rotation of the rotor 1. The Hall IC 4 includes a Hall element 5, a trigger amplifier circuit 6, a transistor Tr1, a low level output current adjusting resistor R1, a high level output current adjusting resistor R2, and an output signal level detecting resister R3. The Hall element 5 is coupled magnetically in a magnetic circuit with the permanent magnets 2. The Hall element 5 is powered through a power line 7 and connected to a signal line 12. The Hall element 5 produces an alternating voltage signal at its output terminal as a result of changes in magnetic flux produced with rotation of the rotor 1. The alternating voltage signal is applied from the Hall element 5 to the trigger amplifier circuit 6. The trigger amplifier circuit 6, which is powered through the power line 7 and connected to the signal line 12, shapes the waveform of the alternating voltage signal applied thereto in to a rectangular waveform. The shaped and amplified signal (rectangular pulse signal) is applied from the trigger amplifier circuit 6 to operate the transistor Tr1. For this purpose, the trigger amplifier circuit 6 has an output terminal coupled to the base electrode of the transistor Tr1, the emitter electrode of which is connected to the signal line 12. The collector electrode of the transistor Tr1 is connected through the high level output current adjusting resistor R2 to the power line 7. The low level output current adjusting resistor R1 is connected between the power line 7 and the signal line 12.

The vehicle road wheel speed sensor 3 is connected through two connection lines 11 and 15 to a control unit 8 placed at a position remote from the vehicle road wheel speed sensor 3. The control unit 8 includes a constant-voltage regulated power supply 9 for supplying power to the vehicle road wheel speed sensor 3 and a central processing unit (CPU) 13 for detecting the speed of rotation of the vehicle road wheel in response to a voltage V developed across the output signal level detecting resistor R3. The power supply 9 is connected through a power line 10 to the connection line 11 which in turn is connected to the power line 7. The signal line 12 is connected through the connection line 15 to a line 14 which is connected to the CPU 13 and also grounded through the output signal level detecting resistor R3.

Figure 2:
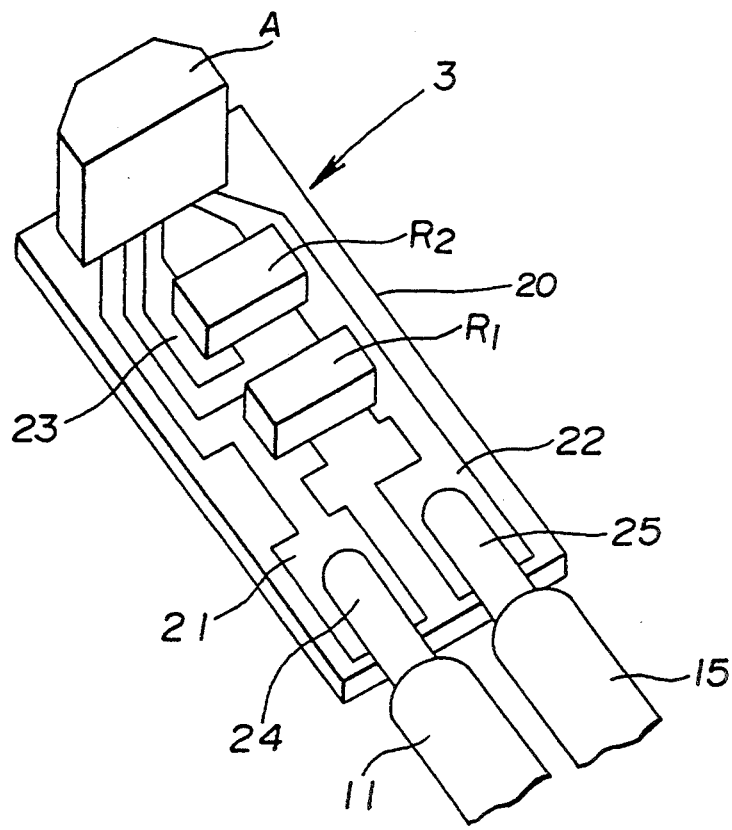
FIG. 2 is an enlarged perspective view of the vehicle road wheel speed sensor of FIG. 1.

Referring to FIG. 2, the vehicle road wheel speed sensor is shown in the form having circuit patterns 21, 22 and 23 printed on a circuit board 20 with the Hall IC 4, the resistor R1 and the resistor R2 being soldered to the circuit patterns 21, 22 and 23. The connection lines 11 and 15 have lead terminals 24 and 25 soldered on the circuit patterns 21 and 22 corresponding to the power and signal lines 7 and 12, respectively. The circuit board 20 on which the Hall IC 4, the low level output current adjusting resistor R1 and the high level output current adjusting resistor R2 are arranged is enclosed in an unshown casing made of a non-magnetic material such as aluminum, synthetic resin or the like.

Figure 3:
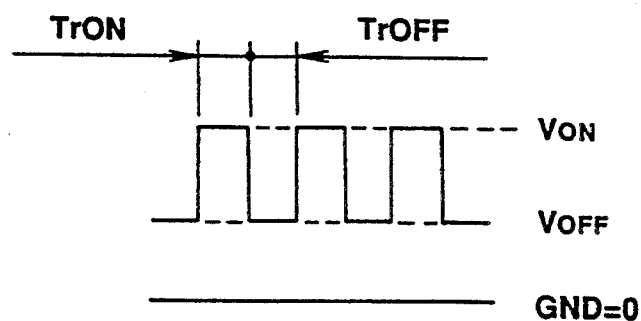
FIG. 3 illustrates a voltage waveform showing the voltage developed across the output signal level detecting resistor of FIG. 1.

Referring to FIG. 3, the operation of the vehicle road wheel speed sensor of the invention is described. After the vehicle starts, the rotor 1 rotates to switch the transistor Tr1 on and off at intervals of time proportional to the speed of rotation of the vehicle road wheel. When the transistor Tr1 is "off" (that is, in the non-conductive state), the current It (off) outputted from the vehicle road wheel speed sensor 3 to the control unit 8 is equal to the sum of the current Ii consumed in the Hall IC 4 and the current I1 through the low level output current adjusting resistor R1. Thus, the voltage V developed across the output signal level detecting resistor R3 is at a low level Voff indicated as Voff=R3×(Ii+I1), as shown in FIG. 3. When the transistor Tr1 is "on" (or in the conduction state), the current It(on) outputted from the vehicle road wheel speed sensor 3 to the control unit 8 is equal to the sum of the current Ii consumed in the Hall IC 4, the current I1 through the low level output current adjusting resistor R1 and the current I2 through the high level output current adjusting resistor R2. Thus, the voltage V across developed the output signal level detecting resistor R3 is at a high level Von indicated as Von=R3×(Ii+I1+I2).

Under a locked condition of the vehicle road wheel, the rotor 1 stops its rotation and no magnetic flux change is produced. In this case, the transistor Tr1 remains "on" or "off" to hold the voltage V across the output signal level detecting resistor R3 at the low level Von or at the high level Voff. It can be seen from a study of FIG. 3 that the low and high levels Von and Voff are different from zero. When at least one of the connection lines 11 and 15 is broken, the voltage V developed across the output signal level detecting resistor R3 is held at zero, as shown in FIG. 3. Since the voltage V developed across the output signal level detecting resistor R3 is different when the vehicle road wheel is locked than when at least one of the connection lines 11 and 15 is broken. With the vehicle road wheel speed sensor of the invention, it is possible to detect a breakage in the connection lines 11 and 15 when the voltage developed across the output signal level detecting resistor R3 is zero. Furthermore, the vehicle road wheel speed sensor of the invention requires only two connection lines for connection of the vehicle wheel speed sensor to a control unit.

What is claimed is:

1. A road wheel speed sensor for use with an automotive vehicle supported on road wheels, comprising:

a processor;

means for producing a pulsating variation in magnetic flux with rotation of one of the road wheels;

a signal converter for converting the pulsation magnetic flux variation into a rectangular pulse signal;

a transistor responsive to the rectangular pulse signal for switching between conductive and non-conductive states, the transistor having a base electrode for receipt of the rectangular pulse signal fed thereto from the signal converter, an emitter electrode and a collector electrode;

a power line for connection of the signal converter to a source of power;

a signal line for connection of the emitter electrode to the processor;

a first resistor connected between the power line and the signal line;

a second resistor connected between the power line and the collector electrode of the transistor;

a third resistor connected between the signal line and the ground;

the processor for calculating a speed of rotation of the road wheel in response to a voltage developed across the third resistor.

2. The road wheel speed sensor as claimed in claim 1, wherein the power source is a constant-voltage regulated power supply.

* * * * *